Oct. 28, 1958  H. L. BOWDITCH ET AL  2,858,527
ELECTROPNEUMATIC TELEMETERING APPARATUS
Filed Sept. 14, 1954  2 Sheets-Sheet 2

INVENTORS
Hoel L. Bowditch
Everett O. Olsen
BY
Curtis, Morris & Safford
ATTORNEYS

United States Patent Office 2,858,527
Patented Oct. 28, 1958

2,858,527

ELECTROPNEUMATIC TELEMETERING APPARATUS

Hoel L. Bowditch, Foxboro, and Everett O. Olsen, Wrentham, Mass., assignors to The Foxboro Company, Foxboro, Mass., a corporation of Massachusetts Application September 14, 1954, Serial No. 455,968

17 Claims. (Cl. 340—187)

This invention relates to voltage measuring apparatus. More particularly, this invention relates to apparatus for converting low-power, direct-current voltages to signals of relatively high power that may be transmitted to and used to operate one or more of a variety of indicating, recording or condition controlling devices.

Industrial instrumentation systems commonly in use have for some time now employed recording and control devices that are located a considerable distance away from the process being controlled. Such remotely operated systems are particularly advantageous where the process is spread over large areas, for example, in a petroleum refining plant, and often include a centrally-located panel display containing many and varied recording and control eqeuipments each corresponding to one or more particular aspects of the process under control. With the large number of instruments typically required for precise control, the size of such centrally-located panels or equipment groupings has become considerable; consequently, it is important that steps be taken to reduce the space requirements of the various units making up the central display.

One way in which the size may be reduced is to re-arrange the instrumentation system so that a portion of the necessary functions are performed away from the panel display, leaving only the essential indicating and control adjusting elements in the central grouping. For example, in a voltage measuring system, the typically low-level signal to be measured may be operated on (i. e. amplified, compared to a measurement standard, etc.) in a region remote from the central display, e. g. at the place where the voltage is produced, in such a way as to create an appropriate high-power signal suitable for transmission to simplified display and control units which may be located a considerable distance away. Devices for accomplishing this purpose are often referred to as "transmitters."

However, voltage-measurement transmitters available heretofore have not satisfactorily met the special practical requirements of such instruments. For example, it is important that the transmitter be rugged and capable of continuous operation for long periods of time under adverse conditions without adjustment, replacement of parts, or other maintenance activities, since such equipment will likely be installed in relatively inaccessible locations. It also is important that the transmitted signal be a highly stable and accurate reflection of the condition (e. g. temperature) being measured, since the overall accuracy of the indicating, recording or control apparatus in the central station depends upon the receipt of an accurate measurement signal. Furthermore, it is important that the equipment be simple in design, and particularly that it not require auxiliary calibrating elements such as standard cells, etc.

Accordingly, it is an object of the present invention to provide voltage measuring apparatus that is superior to previous such apparatus. It is a further object of this invention to provide a signal transmitting device that is simple in construction, stable in operation, and economical to manufacture.

In an embodiment of the invention described hereinbelow in more detail, a temperature-sensitive thermocouple is connected to the signal winding of a "second-harmonic converter" (i. e. a magnetic device adapted to convert direct-current signals to proportional alternating-current signals) in the input circuit of a tuned amplifier. The resultant alternating-current signal is intensified by several stages of amplification, and is subsequently rectified in a phase-sensitive detector. The amplified direct-current output signal is used to drive a balanced calibrated transducer adapted to produce a pneumatic signal, for transmission to a remotely located recorder, controller, etc., the pressure of which is proportional to the magnitude of the direct current.

A fixed portion of this direct current flows through a resistor in a bridge network, the output voltage of which is connected, as a feedback signal, in series opposition to the signal fed to the amplifier by the thermocouple. The circuitry is arranged to provide virtually 100% feedback, so that the magnitude of the direct current is an effective measure of the thermocouple output voltage. Since the direct-current output of the amplifier is essentially proportional to the voltage to be measured, and since the transducer produces a pneumatic signal proportional to this direct current, the transmitter unit is well adapted to serve as an accurate and stable link in the measurement channel leading to the central station indicating and control equipment.

Other objects, aspects and advantages of the invention will be partly apparent from, and partly pointed out in, the following specification considered together with the accompanying drawings, in which.

Figure 1:
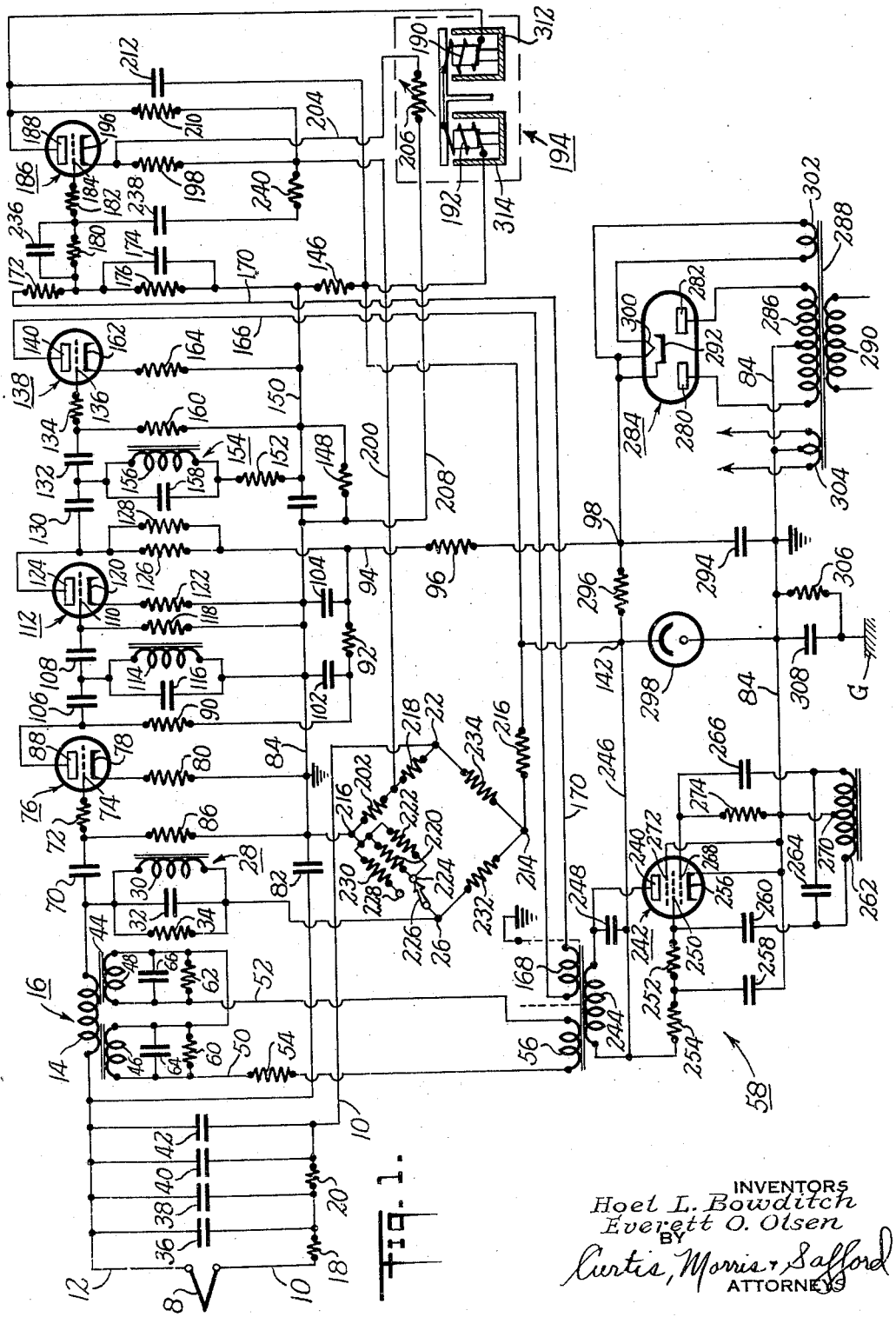
Figure 1 is a schematic circuit diagram showing the voltage amplifier and feedback arrangements.
Figure 2:
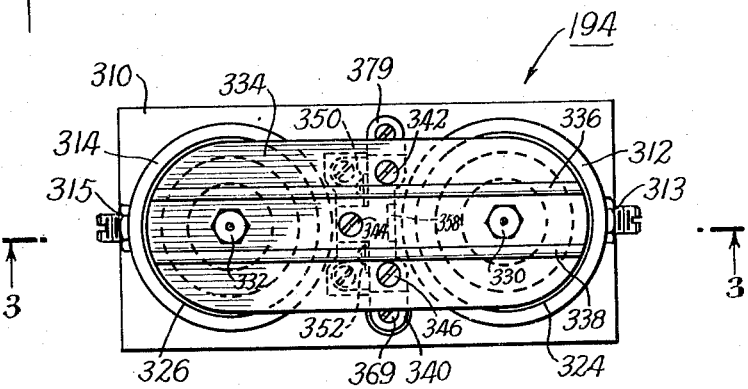
Figure 2 is an plan view of the transducer which is connected to the output of the amplifier of Figure 1.

Referring now to Figure 1, at the upper left hand corner thereof is shown a thermocouple 8, which may be located in a furnace or the like and which produces a low-level, direct-current voltage the magnitude of which is determined by the thermocouple temperature. One thermocouple lead 12 is connected to the left hand end of a signal winding 14, forming part of a second harmonic converter generally indicated at 16. The other thermocouple lead 10 is connected through two isolation resistors 18 and 20 to the right hand output terminal 22 of a bridge network generally indicated at 24. The other output terminal 26 of this bridge is connected through a resonant network 28, comprising the parallel combination of an inductor 30, a capacitor 32 and a load resistance 34 back to the right hand end of the signal winding 14. This circuit 28 is tuned to resonance at the output frequency of the second-harmonic converter 16.

The thermocouple leads 10 and 12 may physically be of considerable length, and four filter capacitors 36, 38, 40 and 42 are bridged between these leads at convenient positions to absorb stray pick-up signals from neighboring electrical equipment and the like.

The voltage produced by the thermocouple 8 tends to cause a direct current to flow through the signal winding 14, the conductive path being completed from the signal winding through the tuned circuit 28, across the output terminals of the bridge 24, and through the isolation resistors 18 and 20 back to the thermocouple. As will be explained in more detail, the bridge 24 forms part of a feedback circuit arranged to produce a direct-current potential between the bridge output terminals 22 and 26 that opposes and substantially matches the voltage produced by the thermocouple 8 so as to reduce the direct current flowing through the signal winding 14 nearly to zero.

The signal winding 14 is wound on a core structure 44 which may be formed of two ring cores of ferromagnetic material. Two alternating-current energizing windings 46 and 48 are also wound on the core structure and are connected in series so as to produce opposing flux with respect to the signal winding 14. The windings 46 and 48 are connected by two leads 50 and 52 and through a resistor 54 to an output winding 56 of an oscillator generally indicated at 58. This oscillator may deliver a signal of 1000 cycles per second, or any other frequency may be used that is suited to the characteristics of the other apparatus. The oscillator 58 preferably is of the "electron-coupled" type to assure a stable output frequency.

When there is no direct current flowing through the signal winding 14, the second harmonic converter 16 is balanced and no alternating-current component is introduced in the signal winding. Connected in parallel with each of the winds 46 and 48 is a resistor 60 and 62 and a capacitor 64 and 66, which serve to correct for any inequalities of the windings 46 and 48 and provide a more complete balance of the fundamental alternating voltage induced in the signal winding 14 when no direct current flows therein.

However, if direct current flows in the signal winding 14, an alternating-current component is introduced in this winding at a frequency double that of the signal delivered by the oscillator 58. It will be apparent that the direct-current flux at any given instant opposes the flux produced by the oscillator 58 in one of the windings 46 and 48 and assists the flux in the other one of these windings. During the succeeding half cycle, the direct current aids the flux in the other winding. When direct current flows in the opposite direction through the signal winding, the phase of the alternating-current component is reversed. The principles of operation and construction of devices of this general type are well known; see, for example, U. S. Patent 2,164,383 issued to Burton on July 4, 1939.

The alternating-current voltage developed across the signal winding 14 is coupled through two direct-current blocking capacitors 70 and 82 to the input circuit of an electronic amplifier. This input circuit includes a series resistor 72 which is connected to the grid 74 of a triode tube generally indicated at 76, the cathode 78 of this tube being connected through a resistor 80 (which provides a small amount of degeneration to improve stability) to a common lead 84 connected to the amplifier chassis. A grid return resistor 86 is connected between the chassis lead 84 and the junction between the first blocking capacitor 70 and the series resistor 72.

The anode 88 of this tube 76 is provided with positive energizing potential through a load resistor 90 which is connected at its remote end through an isolation resistor 92, a lead 94, and a second isolation resistor 96 to one high voltage output terminal 98 of a power supply generally indicated at 100. Each end of the isolation resistor 92 is connected through a corresponding decoupling capacitor 102 and 104 to the common chassis lead 84 to minimize fluctuations in the supply voltage.

The amplified alternating voltage on the anode 88 is coupled through two series-connected capacitors 106 and 108 to the grid 110 of a second triode amplifier tube generally indicated at 112. Connected between the junction of these two coupling capacitors and the common chassis lead 84 is a tuned circuit comprising an inductor 114 and a capacitor 116, and which is resonant at twice the frequency of the oscillator 58 (i. e. the output frequency of the second-harmonic converter 16). A grid return resistor 118 is connected between the grid 110 and the common chassis lead 84 in the usual manner. The cathode 120 of this tube is connected to the chassis lead 84 through a small resistor 122, to provide a small amount of degeneration, and the anode 124 is provided with positive energizing potential through two load resistors 126 and 128, in parallel, the remote ends of which are connected to the high voltage lead 94.

The amplified alternating voltage on the anode 124 is coupled through two capacitors 130 and 132 and an input resistor 134, all in series, to the grid 136 of a triode tube generally indicated at 138. This tube is arranged, in effect, as a grid-controlled, phase-sensitive rectifier, and its anode 140 is supplied with a phase-comparison signal of fundamental frequency through a lead 166 which is connected to one end of a second oscillator output winding 168. The other end of this winding 168 is connected through a lead 170, a resistor 172, and a load network comprising a filter capacitor 174 in parallel with a resistor 176; the anode current path is completed from the load network through a lead 150 and a small resistor 164 back to the cathode 162 of the tube 138. The lead 150 is also connected through a grid return resistor 160 and the input resistor 134 to the grid 136 of this tube.

Since, with this arrangement, the direct-current output voltage across the filter capacitor 174 will normally be negative by a substantial amount, the grid-controlled rectifier stage 138 is biased a corresponding amount positive to provide a proper operating level for the final amplifier stage (to be described). For this purpose, the lead 150 is connected to the junction of two resistors 146 and 148 forming a voltage divider network; the first of these resistors is returned to the common chassis lead 84, and the other is connected through a lead 144 to a second high voltage output terminal 142 in the power supply 100.

Reverting now to the input circuit of the grid-controlled rectifier 138, a resonant circuit, generally indicated at 154 and comprising an inductor 156 and a capacitor 158 in parallel, is connected at its upper end to the junction of the two coupling capacitors 130 and 132, the lower end being returned through a resistor 152 back to the lead 150. This circuit 154 is tuned for resonance at very nearly twice the output frequency of the oscillator 58, but is slightly mistuned in order to shift the phase of the double-frequency signal induced in the signal winding 14. This phase shift makes it possible to obtain phase-sensitive detection with a comparison signal of fundamental frequency, as will be explained, and preferably is of such a magnitude to provide, in combination with the usual phase-shifts caused by the other amplifier elements, a total phase shift of about 90 electrical degrees between the signal winding 14 and the grid 136 of the tube 138.

By introducing a phase shift of approximately 90 degrees, the positive peak of the phase-comparison voltage fed from the oscillator output winding 168 to the anode 140 will, for one phase orientation of the double-frequency signal (i. e. for a given direction of current flow through the signal winding 14), coincide with alternate positive peaks of the double-frequency signal on the grid 136. When the double-frequency signal is reversed in phase from such an orientation (as when the current flow through the signal winding 14 reverses direction), the positive peak of the fundamental comparison voltage on the anode 140 will coincide with alternate negative peaks of the double-frequency signal on the grid 136. Consequently, the grid-controlled rectifier 138 will pass more current for one phase orientation than for the reverse orientation, and hence serves to detect the direction of current flow through the signal winding 14 as well as the magnitude of the double-frequency signal.

The current flow through the tube 138 builds up a direct-current output voltage across the capacitor 174, and this signal is direct-coupled through two series-connected resistors 180 and 182 to the grid 184 of a triode tube generally indicated at 186. The anode 188 of this tube is supplied with positive energizing potential through the coils 190 and 192 of a transducer unit generally indicated at 194 (more fully described hereinbelow) and the high voltage lead 144. A filter capacitor 212 is bridged across the output terminals of the transducer coils 190 and 192 to minimize signal fluctuations.

The cathode 196 of this tube 186 is connected through a resistor 198 and a lead 200 to a feedback resistor 202 in the bridge 24 previously mentioned, the current path being completed through the upper bridge terminal 216 to the common chassis lead 84. The cathode 196 is also connected through a lead 204, a bias adjusting variable temperature sensitive resistor 206 (located in the transducer 194) and a lead 208 back to the chassis lead 84. This variable temperature sensitive resistor 206 serves as a temperature compensator for changes in the magnetic properties of the transducer 194 caused by changes in ambient temperatures. Bias potential for the cathode 196 is provided through a voltage dropping resistor 210 connected between the anode 188 and the feedback lead 200.

The bridge 24 is analagous to the type of network known as a Wheatstone bridge, and includes four series-connected resistance arms. The lower energizing terminal 214 of this bridge is connected through a resistor 216 to the high voltage terminal 142 of the power supply 100, and the upper terminal 216 is connected directly to the common chassis lead 84.

Current flowing into the bridge 24 through the terminal 214 splits into two components which pass, respectively, through a pair of matched resistors 232 and 234 comprising the lower left and lower right hand arms of the bridge. The left hand current path is completed (when the apparatus is in operation) back to the chassis lead 84 through the movable arm 226 of a double-pole, single-throw switch, a contact 224 of this switch, and two resistors 220 and 222 in parallel. One of these two resistors is temperature-sensitive (e. g. formed of a nickel composition), and serves as the usual cold-junction compensation for the thermocouple 8. When the movable arm 226 is moved over the other switch contact 228, the left hand current path is completed through a standardizing resistor 230 for calibration purposes. The right hand current path is completed back to the chassis lead 84 through a resistor 218 in series with the feedback resistor 202. All of the resistors in the bridge 24, except for the temperature-sensitive resistor 222, are thermally stable, e. g. wire-wound precision resistors.

It will be apparent that the balance of the bridge 24, i. e. the potential between the bridge output terminals 22 and 26, is dependent upon the magnitude of current flowing from the amplifier output tube 186 through the feedback resistor 202. If, for example, the voltage of the thermocouple 8 increases, the current through the tube 186 and the feedback resistor 202 will also increase, and the circuitry is so arranged that the change of potential between the bridge output terminals 22 and 26 effectively nullifies the increased voltage of the thermocouple 8 with respect to the signal winding 14. That is, the bridge output potential continuously matches the thermocouple voltage, thereby eliminating the need for auxiliary voltage comparison devices such as standard cells, etc. In the embodiment described herein, the amplifier gain is sufficient to provide just slightly under 100% feedback, e. g. about 99.8%.

Accordingly, the change of current flowing through the feedback resistor 202 in the bridge 24 will be an accurate measure of the change in voltage of the thermocouple 8, and this change in current is proportionately related to the change in current through the transducer coils 190 and 192. In many instances, the bias adjusting potentiometer 206 may not be needed, in which event the current flowing through the transducer coils 190 and 192 will be exactly equal to the current flowing through the feedback resistor 202. When desired, this condition may also be obtained by placing the transducer coils directly in series with the feedback lead 200, to assure identity between the calibrated current flowing through the feedback resistor 202 and the current flowing through the transducer coils.

With a feedback arrangement such as described hereinabove, it has been found advantageous to use a frequency-selective network in the amplifier channel to assure stability. For this purpose, referring now to the input circuit of the last amplifier stage 186, a small capacitor 236 is placed in parallel with the resistor 180, and a relatively large capacitor 238 and a resistor 240 are connected in series between the junction of resistors 180 and 182 and the feed-back lead 200. In effect, this network provides high response to sudden signal changes (because the voltage across the small capacitor 236 cannot change instantaneously), and a normal response to signal changes that remain for a moderate length of time (because the small capacitor 236 charges fairly rapidly). However, if the signal change remains for a substantial length of time, the network will gradually increase the voltage supplied to the grid 184 (due to charging of the larger capacitor 238) and thereby markedly decrease any persistent or steady-state errors. Thus, this frequency-sensitive network eliminates instability, e. g. "hunting," and at the same time assures substantial freedom from long time errors.

The oscillator 58 in the lower left hand corner of the drawing includes a pentode tube generally indicated at 242, the anode 240 of which is supplied with positive energizing potential through an output winding 244 and a lead 246 connected to the high-voltage output terminal 142 of the power supply 100. A capacitor 248 is connected in parallel with the winding 244 to tune the oscillator output circuit to resonance at the desired frequency. The screen grid 250 of this tube is connected through two isolation resistors 252 and 254 to the high voltage lead 246, and the junction of these two resistors is connected through a decoupling capacitor 258 to the common chassis lead 84.

To assure frequency stability for the amplifier tuned circuits, this oscillator is of the "electron-coupled" type in which alternating potentials are developed in the screen grid circuit. Signal variations on the screen grid 250 are coupled through a capacitor 260 to a tuned circuit, comprising an inductor 262 in parallel with a capacitor 264, which is resonant at the desired oscillator frequency. The other end of the tuned circuit is connected through a coupling capacitor 266 to the control grid 268, in order to provide regenerative feedback, and the inductor 262 is balanced with respect to the chassis by a connection between its center-tap 270 and the lead 84. The cathode 256 and the suppressor grid 272 are connected together and to the chassis lead 84, and the control grid 268 is returned to the chassis lead through a resistor 274, all in the usual manner.

Referring now to the power supply 100 in the lower right hand corner of Figure 1, the anodes 280 and 282 of a full-wave rectifier tube 284 are connected respectively to opposite ends of a secondary winding 286 of a power transformer 288, the primary winding 290 of which may be connected to the usual 110 volt, 60 cps. supply line. The cathode 292 of this rectifier tube is connected directly to one high voltage terminal 98, and a filter capacitor 294 is bridged between this terminal and the common chassis lead 84. The second high voltage terminal 142 is connected to the first terminal 98 by an isolation resistor 296, and a gas tube 298 is connected between this second terminal and the common chassis lead 84 to assure a highly stable output voltage for the oscillator 58, the bridge 24, the phase-sensitive rectifier and the last stage of amplification.

The filaments 300 of the rectifier tube 284 are energized by a winding 302 of the transformer 288, and an additional transformer winding 304 is provided for energizing the heater filaments of the other tubes in the amplifier. Windings 286 and 304 are provided with center-taps which are returned to the common chassis lead 84. It may be noted that the chassis of the amplifier preferably is isolated from "ground," to prevent instability due to circulation of ground currents through the amplifier components. Since, with such an arrangement, there may be an accumulation of static charges on the chassis, a resistor 306 of very high ohmic resistance (e. g. 22 megohms), in parallel with a capacitor 308, is connected between the common chassis lead 84 and ground G (which may be the instrument case, etc.) to provide a leakage path for such static charges.

Figure 3:
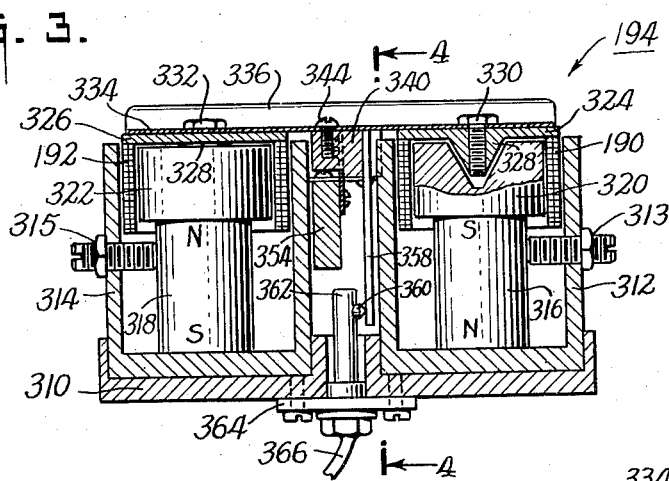
Figure 3 is a longitudinal section taken along line 3—3 of Figure 2, particularly showing the magnetic coils and associated structure.

Figures 2 through 5 show details of the calibrated transducer 194 previously mentioned. Referring now particularly to Figure 3, this unit includes a rectangular base plate 310 formed with two side-by-side circular depressions in each of which is seated a cylindrical cup 312 and 314. These cups are formed of magnetic material (e. g. soft iron), and may be secured to the base plate 310 by bolts (not shown).

In the interior of each cup 312 and 314 is positioned a permanent magnet 316 and 318 which may be cylindrical in shape. These magnets are oppositely polarized, i. e. flux flows upwards in one of the magnets and down in the other. A cylindrical pole piece 320 and 322 is secured to the top of each of the magnets as by means of bolts (not shown) extending down through the corresponding cup bottom. These pole pieces are formed of magnetic material, and their curved vertical surfaces serve, along with the upper interior surface of the corresponding cup, as pole faces to establish an annular air gap of generally uniform width. The magnetic path can be traced from either pole piece, down through the corresponding permanent magnet, radially outward through the bottom of the cup, up the side walls of the cup, and across the air gap back to the pole piece. Adjustment bolts 313 and 315 extend through the side walls of the cups, to permit external positioning of the permanent magnets to provide a more perfect balance between the two magnetic paths.

Suspended in each of the annular air gaps is a cylindrical coil structure 190 and 192, which as previously described is energized by the output of the amplifier shown in Figure 1. When current flows through the windings, the magnetic flux in the air gaps produces a force on each coil. Because the magnets are oppositely polarized, the force on one coil will be directed upwardly and the force on the other will be directed downwardly.

The upper horizontal surface of each of these coils 190 and 192 is secured, for example by means of an adhesive lacquer, to a corresponding pad 324 and 326 which may be formed of plastic or the like, and which is formed with a centrally-located and downwardly depending conical portion 328 adapted to mate with a corresponding conical depression in the top of the pole piece 320 and 322. These pads 324 and 326 are secured at 330 and 332 (see also Figure 2), as by means of rivets, to the underside of a generally oval-shaped force bar 334, and which is formed with upstanding channel members 336 and 338 to increase its rigidity and also serving as conduits for the lead wires (not shown) connected to the coils 190 and 192. As will be explained below, this force bar is pivoted at its longitudinal center, and variations in the pull exerted on the coils 190 and 192 by the flux in the corresponding air gaps rocks the force bar throughout a very small range so as to produce an output pneumatic signal having a pressure proportional to the magnitude of the current flowing through the coils.

The force bar 344 is supported by a cross piece 340 (see also Figures 4 and 5) and is firmly secured thereto as by means of three bolts 342, 344 and 346. The side arms of this cross-piece are pivoted, by means of cross-flexures 350 and 352, about an upstanding support member 354 which is secured to the base plate 310.

Secured by a bolt 356 to the right hand side (referring to Figure 3) of the cross-piece 340 is a downwardly depending flapper arm 358, the lower end of which is adjacent the mouth of a nozzle 360 extending out from a hollow tube 362. This tube 362 passes down through a fitting 364 in the base plate 310 to a supply conduit 366 which is connected through a pneumatic line restrictor (not shown) to a source of air under pressure (not shown); positioning of the flapper arm 358 relative to the nozzle 360 controls the rate of air flow through the nozzle and the supply conduit, and, by thus varying the pressure drop across the line restrictor, correspondingly controls the pressure in the conduit 366.

Figure 4:
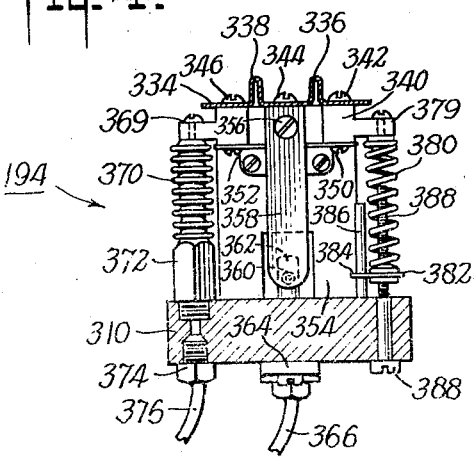
Figure 4 is a cross section taken along line 4—4 of Figure 3, particularly showing the feedback bellows and span adjusting mechanism.
Figure 5:
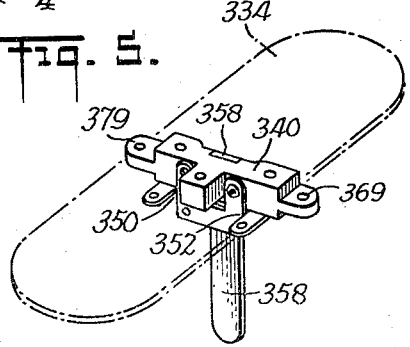
Figure 5 is a detail view, in perspective, showing the force bar mounting and pivoting structure.

Referring now to Figure 4, the transducer includes a feedback bellows 370 which presses against the underside of the left hand arm of the cross-piece 340, and is secured thereto at 369. This bellows is seated on a support 372 secured to the base plate 310, and the interior of the bellows is in communication, through the support 372 and a fitting 374 in the base plate 310, with an output conduit 376. The pressure in this conduit 376 is arranged to be proportional to the pressure in the other conduit 366, for example by means of a pneumatic relay (such as shown in U. S. patent application Serial No. 357,059, filed on May 25, 1953, now Patent No. 2,736,629, by Graydon Smith, but not shown herein to simplify the disclosure). The pressure in the bellows applies a force to the cross-piece 340 which tends to rock the force bar 334 counterclockwise (referring to Figure 3); that is, the point of contact 369 between the bellows and the cross-piece is to the right of the flexure mountings.

To summarize the operation of the transducer elements already described, assume for example that the torques on the force bar 334 are initially in balance, and that the current passing through the coils 190 and 192 increases so as to increase the clockwise torque (referring to Figure 3). This rotates the force bar a small amount about the flexure mountings, and hence moves the flapper arm 358 toward the nozzle 360 so as to decrease the air flow therethrough. The pressure drop across the line restrictor correspondingly decreases, and thereby increases the pressure in the supply conduit 366 and the output conduit 376. The feedback bellows 370 thus tends to expand exerting a force to reposition the force bar 334 in a counterclockwise direction, opposing the torque caused by the change of coil current.

It will be apparent that the pressure in the feedback bellows increases until the difference in feedback torque on the force bar exactly equals the difference in driving torque due to the change in coil current, thereby rebalancing the transducer. Consequently, the pressure in the feedback bellows 370 is a calibrated measure of the current flow through the transducer coils 190 and 192, and this pressure may be transmitted to remote indicating, recording or controlling devices by suitable means (not shown). Since the flux produced by the permanent magnets is essentially invariant with respect to temperature and other environmental conditions, the calibration of the transducer is highly stable; and the balanced arrangement of coils about a central pivot line provides superior dynamic characteristics even under severe vibration or shock.

Referring again to Figure 4, there is secured to the right hand arm 379 of the cross-piece 340 a downwardly extending bias coil spring 380 which is fastened at its lower end to a small flat plate 382. This plate is threadedly engaged with an adjustable bolt 388 extending up through the base plate 310 and includes a pair of forked arms 384 which extend to the left and around opposite sides of a vertical stop rod 386 secured to the base plate. When the bolt 388 is turned, the stop rod 386 prevents rotation of the plate 382, and hence this plate moves up or down on the threaded stem of the bolt to vary the bias force applied to the cross-piece 340. The spring 380 is arranged so that it can be placed in either tension or compression. Adjustment of the bolt 388 controls the "zero set" of the transducer, i. e. the coil current (and hence the temperature of the thermocouple 8) at which the force bar 334 first starts to move.

Accordingly, it will be apparent that apparatus disclosed herein is well adapted to achieve the several objects set forth hereinabove, and particularly provides a transmitter unit that is simple in construction, accurate, and stable in operation. Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as to meet the requirements of particular applications, it being understood that various modifications may be made without departing from the scope of the invention as limited by the prior art.

We claim:

1. For use with an instrumentation system which includes one or more indicating, recording or condition-controlling devices, and wherein the basic source of measurement information is located remotely from said devices, data transmitting apparatus comprising, in combination, a source of direct-current potentials to be measured, amplifier means including an input and an output circuit, said input circuit being coupled to said source of direct-current potentials, a calibrated balanced magnetic transducer having a pivotally-mounted force bar, a pair of coils secured to said force bar at each end thereof, said coils being coupled to said amplifier output circuit, magnetic circuit means including at least one permanent magnet and having a pair of air gaps in each of which is positioned one of said coils, flapper-nozzle means under the control of said force bar, said nozzle being connected through a supply conduit and a line restrictor to a source of gas under pressure so that movement of the flapper relative to the nozzle controls the gas pressure in said nozzle, a feedback bellows mounted adjacent said force bar and arranged to apply a torque to said force bar in opposition to the torque produced by current passing through said coils in said air gaps, means coupling said feedback bellows to said supply conduit to vary the pressure in said bellows in accordance with the positioning of said force bar and to cause the pressure in said feedback bellows to be proportional to the torque applied to said force bar by said coils, feedback means coupling said amplifier output circuit to said input circuit, said feedback means including a sensing network adapted to develop a direct-current output potential that is proportional to the magnitude of current flowing in said amplifier means output circuit and through said transducer coils, and means for connecting the output potential developed by said sensing network in series opposition to the voltage produced by said source of direct-current potential, whereby the resultant voltage developed in said amplifier means input circuit is reduced nearly to zero so that the pneumatic signal produced by said balanced magnetic transducer means is essentially proportional to the voltage of said source of direct-current potential.

2. Voltage measurement and data transmission apparatus for use with remote indicating, recording or controlling equipment, comprising, in combination, a source of direct-current potentials to be measured, a magnetic second-harmonic converter including a signal winding wound on a core of saturable magnetic material, means for connecting said source of direct-current potentials to said signal winding, a source of alternating-current potentials for energizing said second-harmonic converter, amplifier means including a plurality of tuned stages of amplification and having an input and an output circuit, means for coupling the output of said second-harmonic converter to said input circuit, phase-sensitive detection means for said amplifier means and adapted to produce a direct-current signal in said output circuit in accordance with the magnitude and phase of the alternating-current signal coupled to said input circuit by said second-harmonic converter, feedback means connected between said amplifier output circuit and said second-harmonic converter and adapted to produce a direct-current voltage in series opposition to the voltage of said source of direct-current potentials, said feedback means including a resistance-bridge sensing network having a feedback resistor through which flows a current proportional in magnitude to the direct current in said output circuit, and calibrated transducer means coupled to said amplifier output circuit and arranged to produce for transmission over substantial distances a pneumatic signal the pressure of which is proportional to the magnitude of current flowing in said amplifier output circuit.

3. Voltage measurement and data transmission apparatus for use with remote indicating, recording or controlling equipment, comprising, in combination, a source of direct-current potentials to be measured, a magnetic second-harmonic converter including a signal winding and at least one energizing winding wound on a core of saturable magnetic material, means for connecting said source of direct-current potentials to said signal winding, a source of alternating-current potentials connected to said energizing winding, amplifier means including a plurality of stages of amplification, an input and an output circuit for said amplifier means, means for coupling the alternating-current signal developed by said second-harmonic converter to said input circuit, means for shifting the phase of said alternating-current signal, phase-sensitive detection means for said amplifier means and adapted to produce a direct-current signal in said output circuit in accordance with the magnitude and phase of the alternating-current signal coupled to said input circuit by said second-harmonic converter, said detection means including a grid-controlled rectifier having an anode energized by said source of alternating-current potentials, feedback means connected between said amplifier output circuit and said second-harmonic converter and adapted to produce a direct-current voltage in series opposition to the voltage of said source of direct-current potentials, said feedback means including a resistance-bridge sensing network having a feedback resistor through which flows a current proportional in magnitude to the direct current in said output circuit, and calibrated transducer means coupled to said output circuit and arranged to produce for transmission over substantial distances a pneumatic signal the pressure of which is proportional to the magnitude of current flowing in said output circuit.

4. Voltage measurement and data transmission apparatus for use with remote indicating, recording or controlling equipment comprising, in combination, a source of direct-current potentials to be measured, a magnetic second-harmonic converter including a signal winding wound on a core of saturable magnetic material, means for connecting said source of direct-current potentials to said signal winding, a source of alternating-current potentials for energizing said second-harmonic converter, amplifier means including a plurality of tuned stages of amplification, an input and an output circuit for said amplifier means, means for coupling said second-harmonic converter to said input circuit, phase-sensitive detection means for said amplifier means and adapted to produce a direct-current signal in said output circuit in accordance with the magnitude and phase of the alternating-current signal coupled to said input circuit by said second-harmonic converter, feedback means connected between said output circuit and said second-harmonic converter and adapted to produce a direct-current voltage in series opposition to the voltage of said source of direct-current potentials, said feedback means including a resistance-bridge sensing network having a feedback resistor through which flows a current proportional in magnitude to the direct current in said output circuit, a frequency-selective network coupled to one of said stages of amplification for assuring stability and reducing accumulated errors, said network including a plurality of resistors and capacitors adapted to provide a higher than normal response to sudden signal changes or to signal changes that remain for a long period of time, said network also being adapted to provide a normal response to signal changes that remain for a moderate length of time, and calibrated transducer means coupled to said output circuit and arranged to produce for transmission over substantial distances a pneumatic signal the pressure of which is proportional to the magnitude of current flowing in said output circuit.

5. A calibrated transducer adapted to produce pneumatic pressure signals proportional in magnitude to electrical input signals, comprising, in combination, a balanceable force bar, means pivotally supporting said force bar for rotary movement thereabout, coil means secured to said force bar and adapted to be supplied with current from a source of unidirectional potentials, magnetic circuit means including an air gap adapted to receive said coil means, at least one permanent magnet forming part of said magnetic circuit means and adapted to produce flux of substantially constant magnitude across said air gap, whereby the flow of current through said coil means causes a proportional torque to be applied to said force bar about said pivotal support means, pneumatic means under the control of said force bar and adapted to produce a pressure signal in accordance with the positioning thereof in response to current flow through said coil means, feedback means coupled to said pneumatic means and arranged to apply a torque to said force bar that is equal and opposite to the torque caused by said coil means, and output conduit means communicating with said feedback means for supplying to one or more remote indicating, recording or control devices a pneumatic pressure signal proportional to the magnitude of current flow through said coil means.

6. Balanced magnetic transducer apparatus adapted to produce for transmission to remotely-located indicating, recording or condition-controlling devices a pneumatic pressure signal proportional to the magnitude of an input unidirectional electrical signal, comprising, in combination, a rigid longitudinally-extended force bar, cross-flexure mounting means secured to said force bar substantially at the longitudinal center thereof, said force bar being rotatable within a small range about said cross-flexure mounting, first and second coils secured respectively to opposite ends of said force bar, and adapted for connection to a source of direct-current measurement potentials, first and second magnetic circuits each including an annular air gap adapted to receive one of said coils, each of said magnetic circuits including a permanent magnet for producing flux of essentially constant intensity across the corresponding air gap, whereby the flow of current through said coils produces a torque on said force bar about said cross-flexure mounting the magnitude of which is proportional to the current flow in said coils, a flapper arm secured to said force bar for movement therewith, a nozzle associated with said flapper arm and connected through a supply conduit and a line restrictor to a source of gas under pressure for varying the gas pressure in said supply conduit in accordance with the positioning of said flapper arm, a feedback bellows arranged to apply a torque to said force bar in opposition to the torque produced by current flow through said coils, means for transmitting the pressure in said supply conduit to said feedback bellows so that said two torques will continuously be in balance, output conduit means communicating with said feedback bellows, and spring bias means associated with said force bar controlling the zero set of said transducer.

7. For use with amplification apparatus of the type adapted to form a part of data transmission equipment and wherein a direct-current input signal is converted to an alternating-current intelligence signal which is intensified and subsequently reconverted to a direct-current output signal having characteristics determined by corresponding characteristics of the input signal, harmonic phase-sensitive detection apparatus adapted to detect the magnitude and phase orientation of an alternating-current intelligence signal by comparing the intelligence signal to a reference signal having a frequency harmonically related to that of the intelligence signal, comprising, in combination, signal detection means having a single circuit element through which current flows essentially in only one direction, an input circuit for said signal detection means and connected to said circuit element, a source of alternating-current intelligence signals to be detected, first circuit means for feeding said intelligence signals substantially in their entirety to the input circuit of said single circuit element, a source of reference potentials having a frequency harmonically related to the frequency of said intelligence signals, phase-shifting means adapted to establish a phase differential between said reference potentials and said intelligence signal, and second circuit means for coupling said reference potentials to said signal detection means in such a manner that said phase-differentiated and harmonically related intelligence signals and reference potentials are combined in said signal detection means to produce a direct-current output signal responsive to the amplitude and phase orientation of said intelligence signals.

8. For use with amplification apparatus of the type adapted to form a part of data transmission equipment and wherein a direct-current input signal is converted to an alternating-current intelligence signal which is intensified and subsequently reconverted to a direct-current output signal having characteristics determined by the corresponding characteristics of the input signal, harmonic phase-sensitive detection apparatus adapted to detect the magnitude and phase orientation of an alternating-current intelligence signal by comparing the intelligence signal to a reference signal having a frequency harmonically related to that of the intelligence signal, comprising, in combination, signal detection means having a current control device including at least three elements, an input circuit for said signal detection means and connected to a first element of said current control device, a source of alternating intelligence signals to be detected, first circuit means for feeding said intelligence signals to the input circuit of said current control device, a source of reference potentials having a frequency harmonically related to the frequency of said intelligence signals, phase-shifting means adapted to establish a phase differential between said reference potentials and said intelligence signal, and second circuit means for coupling said reference potentials to a second element of said current control device in such a manner that said phase-differentiated and harmonically related intelligence signals and reference potentials are combined in said current control device to produce a direct-current output signal in accordance with the amplitude and phase orientation of said intelligence signals.

9. For use with amplification apparatus of the type adapted to form a part of data transmission equipment and wherein a direct-current input signal is converted to an alternating-current intelligence signal which is intensified and subsequently reconverted to a direct-current output signal having characteristics determined by the polarity and amplitude of the input signal, harmonic phase-sensitive detection apparatus adapted to detect the magnitude and phase orientation of an alternating-current intelligence signal by comparing the intelligence signal to a reference signal having a frequency harmonically related to that of the intelligence signal, comprising, in combination, signal detection means including a vacuum tube having a control grid, an anode and a cathode, an input circuit for said signal detection means and connected to said control grid, a source of alternating intelligence signals to be detected, first circuit means for feeding said intelligence signals to the input circuit of said vacuum tube, a source of reference potentials having a frequency harmonically related to the frequency of said intelligence signals, phase-shafting means adapted to establish a phase differential between said reference potentials and said intelligence signal, and second circuit means for coupling said reference potentials to the anode of said vacuum tube in such a manner that said phase-differentiated and harmonically related intelligence signals and reference potentials are combined in said signal detection means to produce a direct-current output signal in accordance with the amplitude and phase orientation of said intelligence signals.

10. For use with amplification apparatus employing a magnetic second-harmonic converter for transforming a direct-current input signal into an alternating-current intelligence signal having an amplitude and phase orientation determined by the magnitude and polarity of said direct-current input signal, phase-sensitive detection apparatus comprising, in combination, a source of energizing potentials for said second-harmonic converter, signal detection means including a current control device having at least three elements including a control element, said control device being adapted to pass current therethrough in only one direction, first circuit means for coupling the alternating-current intelligence signal produced by said second-harmonic converter to said control element, an output circuit for said current control device, second circuit means for coupling the output of said source of energizing potentials to said output circuit, and phase-shifting means for establishing a phase differential between said intelligence signals and said energizing potentials coupled to said current control device, whereby the unidirectional current flowing in the output circuit of said control device has an average amplitude determined by the amplitude and phase orientation of the alternating-current intelligence signals produced by said second-harmonic converter.

11. For use with amplification apparatus employing a magnetic second-harmonic converter for transforming a direct-current input signal into an alternating-current intelligence signal having an amplitude and phase orientation determined by the magnitude and polarity of said direct-current input signal, detection apparatus comprising, in combination, a source of energizing potentials for said second-harmonic converter, signal detection means including a vacuum tube having at least three elements including an anode and a control grid, first circuit means for coupling the alternating-current intelligence signal produced by said second-harmonic converter to said control element, an output circuit for said signal detection means and connected to said anode, second circuit means for coupling the output of said source of energizing potentials to said output circuit, and phase-shifting means for establishing a phase differential between said intelligence signals and said energizing potentials coupled to said signal detection means, whereby the unidirectional current flowing in the output circuit of said signal detection means has an average amplitude determined by the amplitude and phase orientation of the alternating-current intelligence signals produced by said second-harmonic converter.

12. For use with amplification apparatus employing a magnetic second-harmonic converter for transforming a direct-current input signal into an alternating-current intelligence signal having an amplitude and phase orientation determined by the intensity and polarity of said direct-current input signal, detection apparatus comprising, in combination, a source of energizing potentials for said second-harmonic converter, signal detection means comprising a single circuit element adapted to pass current therethrough in only one direction, an input circuit and an output circuit for said signal detection means, first circuit means for coupling the alternating intelligence signal produced by said second-harmonic converter to said input circuit, second circuit means for coupling the output of said source of energizing potentials to said signal detection means, and phase-shifting means for establishing a phase differential between said intelligence signals and said energizing potentials coupled to said signal detection means, whereby the unidirectional current flowing in the output circuit of said signal detection means is responsive to the amplitude and phase orientation of the alternating-current intelligence signals produced by said second-harmonic converter.

13. Voltage measurement and data transmission apparatus for use with remote indicating, recording or controlling equipment and adapted to produce an output pneumatic signal proportional to the voltage of a source of direct-current potentials being measured, comprising, in combination: a voltage-sensing unit, said unit including a converter for producing alternating-current signals corresponding in amplitude to the magnitude of said direct-current potentials, means for connecting said source of direct-current potentials to said converter, alternating-current amplifier means having an input and an output circuit, means for coupling the alternating-current output of said converter to said amplifier input circuit, detection means for said amplifier means and adapted to produce a direct-current signal in said amplifier output circuit in accordance with the magnitude of the alternating-current signal coupled to said input circuit by said converter, electrical feedback means connected between said amplifier output circuit and said converter and adapted to produce a direct-current voltage substantially equal and in series opposition to the voltage of said source of direct-current potentials, said feedback means including a feedback circuit element through which flows a current proportional in magnitude to the direct current in said output circuit; and an electro-pneumatic transducer unit arranged to produce a pneumatic signal for transmission over substantial distances, said transducer unit comprising a structure of magnetic material having at least one permanent magnet for developing a magnetic field, a balanceable force bar pivotally mounted with respect to said structure, a signal winding disposed within said structure and operable with said magnetic field to apply a torque to said force bar in direct proportion to the flow of current through said winding, pneumatic means under the control of said force bar and adapted to produce an output pneumatic signal in accordance with the positioning of said bar in response to current flow through said signal winding, rebalancing means coupled to said pneumatic means and arranged to apply a second torque to said force bar in opposition to the first-mentioned torque produced by said signal winding, and electrical circuit means serving to feed direct current from said amplifier output circuit to said transducer unit signal winding, whereby said output pneumatic signal is proportional in magnitude to the voltage of said source of direct-current potentials.

14. Voltage measurement and data transmission apparatus for use with remote indicating, recording or controlling equipment and adapted to produce an output pneumatic signal proportional to the voltage of a source of direct-current potentials being measured, comprising, in combination: a voltage-sensing unit, said unit including a converter for producing alternating-current signals corresponding in amplitude to the magnitude of said direct-current potentials, means for connecting said source of direct-current potentials to said converter, alternating-current amplifier means having an input and an output circuit, means for coupling the alternating-current output of said converter to said amplifier input circuit, detection means for said amplifier means and adapted to produce a direct-current signal in said amplifier output circuit in accordance with the magnitude of the alternating-current signal coupled to said input circuit by said converter, electrical feedback means connected between said amplifier output circuit and said converter and adapted to produce a direct-current voltage substantially equal and in series opposition to the voltage of said source of direct-current potentials, said feedback means including a feedback circuit element through which flows a current proportional in magnitude to the direct current in said output circuit; and an electro-pneumatic transducer unit arranged to produce a pneumatic signal for transmission over substantial distances, said transducer unit comprising a structure of magnetic material having means for developing a magnetic field, a balanceable force bar pivotally mounted with respect to said structure, a signal winding coupled to said structure and arranged to apply a torque to said force bar in direct proportion to the flow of current through said winding, pneumatic means under the control of said force bar and adapted to produce an output pneumatic signal in accordance with the positioning of said bar in response to current flow through said signal winding, rebalancing means coupled to said pneumatic means and arranged to apply a second torque to said force bar in opposition to the first-mentioned torque produced by said signal winding, and electrical circuit means serving as the only connection between said sensing unit and said transducer unit, said electrical circuit means being arranged to feed direct current from said amplifier output circuit to said transducer unit signal winding, whereby said output pneumatic signal is proportional in magnitude to the voltage of said source of direct-current potentials.

15. A calibrated transducer adapted to produce pneumatic pressure signals proportional in magnitude to direct-current electrical input signals, comprising, in combination, a balanceable force bar, magnetic circuit means including an air-gap, mounting means pivotally supporting said force bar for rotary movement with respect to said magnetic circuit means, means forming part of said magnetic circuit means adapted to produce flux of substantially constant magnitude across said air-gap, coil means operatively coupled to said magnetic circuit means through said air-gap and arranged to apply a first torque to said force bar in proportion to the flow of direct current through said coil means, pneumatic means under the control of said force bar and adapted to produce a pressure signal having a magnitude corresponding to the rotational position of said force bar as determined by the current flow through said coil means, pressure-responsive rebalancing means coupled to said pneumatic means and arranged to apply a second torque to said force bar in opposition to the first torque caused by said coil means, and output conduit means communicating with said rebalancing means for supplying to one or more remote indicating, recording or control devices a pneumatic pressure signal proportional to the magnitude of current flow through said coil means.

16. A calibrated transducer adapted to produce pneumatic pressure signals proportional in magnitude to direct-current electrical input signals, comprising, in combination, a balanceable force bar, magnetic circuit means including an air-gap, mounting means pivotally supporting said force bar for rotary movement with respect to said magnetic circuit means, at least one permanent magnet forming part of said magnetic circuit means and adapted to produce flux of substantially constant magnitude across said air-gap, coil means operable with the flux in said air-gap to apply a first torque to said force bar in proportion to the flow of direct current through said coil means, pneumatic flapper-nozzle means under the control of said force bar and adapted to produce a pressure signal having a magnitude corresponding to the rotational position of said force bar as determined by the current flow through said coil means, feedback means coupled to said pneumatic means and arranged to apply a second torque to said force bar that is equal and opposite to the first torque caused by said coil means and said magnetic circuit means, and output conduit means communicating with said feedback means for supplying to one or more remote indicating, recording or control devices a pneumatic pressure signal proportional to the magnitude of current flow through said coil means.

17. A calibrated transducer adapted to produce pneumatic pressure signals proportional in magnitude to direct-current electrical input signals, comprising, in combination, a balanceable force bar, magnetic circuit means including an air-gap, mounting means pivotally supporting said force bar for rotary movement with respect to said magnetic circuit means, a permanent magnet forming part of said magnetic circuit means and arranged to produce flux of substantially constant magnitude across said air-gap, coil means operable with the flux crossing the air-gap in said magnetic circuit means to apply a first torque to said force bar in proportion to the flow of direct current through said coil means, pneumatic means comprising a nozzle mounted in fixed relation to said magnetic circuit means and supplied with gas pressure through a restrictor element, flapper means for said force bar and arranged to control the flow of gas through said nozzle so as to produce a pressure signal having a magnitude corresponding to the rotational position of said force bar as determined by the current flow through said coil means, feedback means comprising a pressure-sensitive bellows coupled to said pneumatic means and arranged to apply a second torque to said force bar in opposition to the first torque caused by said coil means, and output conduit means communicating with said feedback means for supplying to one or more remote indicating, recording or control devices a pneumatic pressure signal proportional to the magnitude of current flow through said coil means.

References Cited in the file of this patent

UNITED STATES PATENTS

| | | |
|---|---|---|
| 2,523,198 | Davies | Sept. 19, 1950 |
| 2,640,974 | Oman et al. | June 2, 1953 |
| 2,653,308 | Allen | Sept. 22, 1953 |